(12) United States Patent
Gaither

(10) Patent No.: US 11,721,875 B2
(45) Date of Patent: Aug. 8, 2023

(54) BATTERY PACK ASSEMBLIES HAVING ELONGATED TERMINAL CONNECTORS AND VEHICLES HAVING THE SAME

(71) Applicant: Toyota Motor Engineering & Manufacturing North America, Inc., Plano, TX (US)

(72) Inventor: Geoffrey D. Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 555 days.

(21) Appl. No.: 16/806,513

(22) Filed: Mar. 2, 2020

(65) Prior Publication Data

US 2021/0273210 A1    Sep. 2, 2021

(51) Int. Cl.
*H01M 50/543*    (2021.01)
*B60L 50/64*    (2019.01)
(Continued)

(52) U.S. Cl.
CPC ............. *H01M 50/543* (2021.01); *B60K 1/04* (2013.01); *B60L 50/64* (2019.02);
(Continued)

(58) Field of Classification Search
CPC .. H01M 50/543; H01M 50/502; H01M 50/20; H01M 2220/20; B60L 50/64;
(Continued)

(56) References Cited

U.S. PATENT DOCUMENTS 4,429,944 A * 2/1984 Bell ..................... H01R 11/282
439/759
4,835,407 A * 5/1989 Kataoka .................. B60R 25/04
340/5.72

(Continued)

FOREIGN PATENT DOCUMENTS

DE    102011054424     *   4/2013
DE    102011054424 A1     4/2013
(Continued)

*Primary Examiner* — Alexander Usyatinsky
(74) *Attorney, Agent, or Firm* — Dinsmore & Shohl LLP

(57) ABSTRACT

A battery pack assembly includes a battery pack, a first elongated terminal connector, a second elongated terminal connector, and a biasing member. The battery pack includes a plurality of battery cells each having a terminal. The first elongated terminal having a plurality of first recesses. The second elongated terminal having plurality of second recesses. The first elongated terminal connector and the second elongated terminal connector movable between an engaged position and a disengaged position. The biasing member extends between the first elongated terminal and the second elongated terminal, and the biasing member biases the first elongated terminal and the second elongated terminal towards the engaged position. In the engaged position, the plurality of first recesses are engaged with the terminals of the plurality of battery cells and the plurality of second recesses are engaged with the terminals of the plurality of battery cells.

18 Claims, 7 Drawing Sheets

(51) Int. Cl.
*B60K 1/04* (2019.01)
*H01M 50/502* (2021.01)
*B60K 6/28* (2007.10)
*B60L 50/60* (2019.01)

(52) U.S. Cl.
CPC ............ *H01M 50/502* (2021.01); *B60K 6/28* (2013.01); *B60K 2001/0405* (2013.01); *B60L 50/66* (2019.02); *B60Y 2200/91* (2013.01); *B60Y 2200/92* (2013.01); *H01M 2220/20* (2013.01)

(58) Field of Classification Search
CPC .. B60L 50/66; B60K 1/04; B60K 6/28; B60K 2001/0405; B60Y 2200/91; B60Y 2200/92
See application file for complete search history.

(56) References Cited

U.S. PATENT DOCUMENTS

| | | | | |
|---|---|---|---|---|
| 6,391,489 | B1* | 5/2002 | Winch | H01R 11/288 439/500 |
| 6,538,341 | B1* | 3/2003 | Lang | H02J 7/0044 307/18 |
| 6,762,572 | B1* | 7/2004 | Ishii | B60L 3/00 323/282 |
| 9,324,986 | B2* | 4/2016 | Ahn | H01M 50/503 |
| 10,236,597 | B2 | 3/2019 | Meyer | |
| 2007/0009787 | A1* | 1/2007 | Straubel | H01M 50/20 429/100 |
| 2009/0139781 | A1* | 6/2009 | Straubel | B60L 53/14 701/22 |
| 2014/0335393 | A1* | 11/2014 | Wada | H01M 50/291 429/121 |
| 2016/0018522 | A1* | 1/2016 | Shen | G01S 17/50 356/614 |

FOREIGN PATENT DOCUMENTS

| | | | |
|---|---|---|---|
| JP | 2011233492 | * | 11/2011 |
| JP | 2011233492 A | | 11/2011 |

* cited by examiner

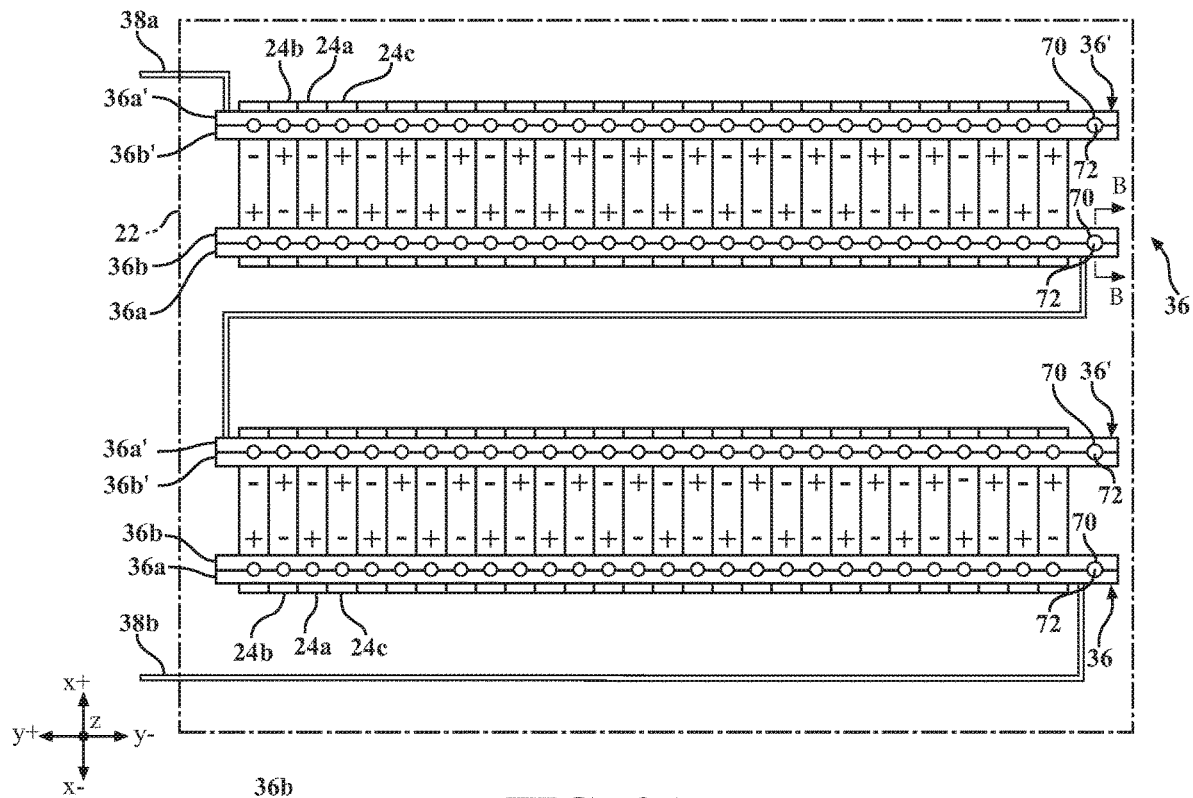
FIG. 2A
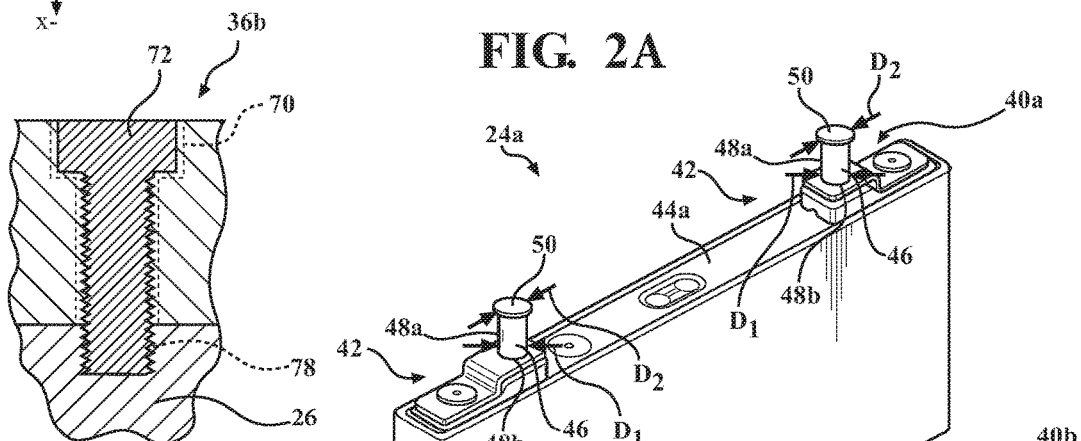
FIG. 2B
FIG. 3

BATTERY PACK ASSEMBLIES HAVING ELONGATED TERMINAL CONNECTORS AND VEHICLES HAVING THE SAME

TECHNICAL FIELD

The present specification generally relates to a battery pack assemblies and, more specifically, to battery packs having a pair of elongated terminal connectors moveable between an engaged position and disengaged position.

BACKGROUND

Hybrid electric vehicles include battery packs, which may include a stack of battery cells and a bus bar module provided on top of the stack of battery cells. The bus bar module is generally configured to carry a voltage and current to a component of the vehicle (e.g., a powertrain component of the vehicle). Each of the plurality of cells may include a pair of externally threaded terminals, and the bus bar module may include a plurality of housings that each includes a terminal plate for connecting to the terminals of the cells and a bus bar. The terminal plates of the bus bar module are secured to the externally threaded terminals of the plurality of cells by nuts. To gain access to the individual battery cell, all of the nuts along the length of the bus bar module must be removed in order to remove the bus bar module.

Accordingly, a need exists for a device that enables quick access to each battery cell within the battery pack while providing voltage and current from the battery pack to a component of the vehicle.

SUMMARY

In one embodiment, a battery pack assembly includes a battery pack, a first elongated terminal connector, a second elongated terminal connector, and a biasing member. The battery pack includes plurality of battery cells. Each of the plurality of battery cells includes at least one terminal. The first elongated terminal connector includes a plurality of first recesses. The second elongated terminal connector includes a plurality of second recesses. The first elongated terminal connector and the second elongated terminal connector are movable between an engaged position and a disengaged position. The biasing member extends between the first elongated terminal connector and the second elongated terminal connector. The biasing member biases the first elongated terminal connector and the second elongated terminal connector towards the engaged position. In the engaged position, the plurality of first recesses are engaged with the at least one terminal of the plurality of battery cells and the plurality of second recesses are engaged with the at least one terminal of the plurality of battery cells. In the disengaged position, the plurality of first recesses are disengaged from the at least one terminal of the plurality of battery cells and the plurality of second recesses are disengaged from the at least one terminal of the plurality of battery cells.

In another embodiment, a vehicle includes a battery pack positioned within the vehicle. The battery pack includes a plurality of battery cells, a first elongated terminal connector, a second elongated terminal connector, and a biasing member. Each of the plurality of battery cells includes at least one terminal. The first elongated terminal connector includes a plurality of first recesses. The second elongated terminal connector includes a plurality of second recesses. The first elongated terminal connector and the second elongated terminal connector are movable between an engaged position and a disengaged position. The biasing member extends between the first elongated terminal connector and the second elongated terminal connector. The biasing member biases the first elongated terminal connector and the second elongated terminal connector towards the engaged position. In the engaged position, the plurality of first recesses are engaged with the at least one terminal of the plurality of battery cells and the plurality of second recesses are engaged with the at least one terminal of the plurality of battery cells. In the disengaged position, the plurality of first recesses are disengaged from the at least one terminal of the plurality of battery cells and the plurality of second recesses are disengaged from the at least one terminal of the plurality of battery cells.

In yet another embodiment, a method of removing an individual battery cell from a battery pack is provided. The battery pack includes a plurality of battery cells. Each battery cell includes at least one terminal. The method includes removing a fastener from a first elongated terminal connector and a second elongated terminal connector. The fastener secures the first elongated terminal connector and the second elongated terminal connector to the battery pack. The first elongated terminal connector having a plurality of first recesses. The second elongated terminal connector having a plurality of second recesses. The method includes displacing the first elongated terminal connector and the second elongated terminal connector from an engaged position to a disengaged position against a biasing force of a biasing member extending between the first elongated terminal connector and the second elongated terminal connector. The method includes removing the first elongated terminal connector and the second elongated terminal connector from the battery pack in a first direction. The method includes removing the individual battery cell from the battery pack in the first direction.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically depicts a top view of the battery pack assembly of FIG. 1, with pairs of elongated terminal connectors in an engaged position according to one or more embodiments shown or described herein;

FIG. 2B schematically depicts a partial cross-sectional view taken along the lines B-B of FIG. 2A, according to one or more embodiments described herein;

FIG. 3 schematically depicts a perspective view of a battery cell of the battery pack assembly of FIG. 1 according to one or more embodiments described herein;

DETAILED DESCRIPTION

Figure 1:
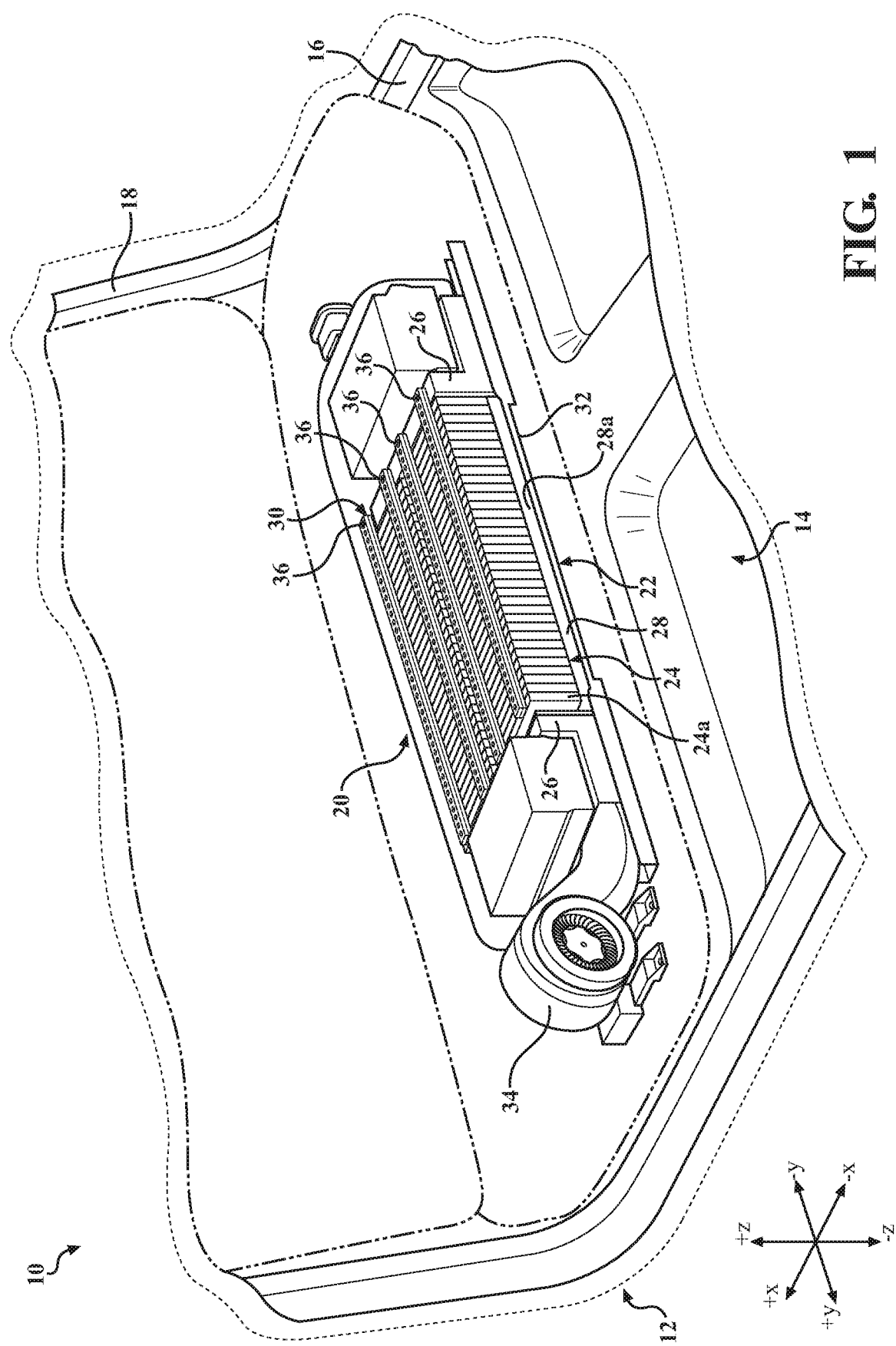
FIG. 1 schematically depicts a partial perspective view of a vehicle and a battery pack assembly according to one or more embodiments shown or described herein.

Embodiments described herein generally relate to a battery pack assembly that includes a battery pack. The battery pack includes a plurality of battery cells, and each battery cell includes a terminal side and an opposite housing side. A plurality of terminals extends from the plurality of battery cells on the terminal side. A first elongated terminal connector extends across a length of the battery pack. The first elongated terminal connector includes a plurality of first recesses. A second elongated terminal connector extends across the length of the battery pack. The second elongated terminal connector includes a plurality of second recesses. A biasing member extends between the first elongated terminal connector and the second elongated terminal connector.

The first elongated terminal connector and the second elongated terminal connector are movable between an engaged position and a disengaged position. The biasing member biases the first elongated terminal connector and the second elongated terminal connector towards the engaged position. In the engaged position, each terminal of the plurality of battery cells is received within and engaged with the plurality of first recesses and each terminal of the plurality of battery cells is received within and engaged with the plurality of second recesses. In the disengaged position, each terminal of the plurality of battery cells is spaced apart and disengaged from the plurality of first recesses and each terminal of the plurality of battery cells is space part and disengaged from the plurality of second recesses.

The first elongated terminal connector and the second elongated terminal connector are secured to the battery pack assembly by a fastener. As such, in the engaged position, the first elongated terminal connector and the second elongated terminal connector retain the plurality of battery cells within the battery pack assembly. In the disengaged position, the fastener is removed such that the first elongated terminal connector and the second elongated terminal connector are removed from the battery pack assembly thereby permitting each battery cell of the plurality of battery cells to be easily and quickly removed from the battery pack assembly.

In the engaged position, the terminals of the plurality of battery cells are electrically coupled to the first elongated terminal and the second elongated terminal to permit the transmission or reception of energy between the battery cells of the plurality of battery and a component of a vehicle. In the disengaged position, the terminals of the plurality of battery cells are disconnected from the first elongated terminal and the second elongated terminal to inhibit the transmission or reception of energy between the battery cells of the plurality of battery cells and the component of the vehicle.

Furthermore, the first recesses and the second recesses each include a conductive portion. Accordingly, in the engaged position, the first elongated terminal connector and the second elongated terminal connector are electrically coupled to each of the plurality of battery cells via the respective terminal. As such, the first elongated terminal connector and second elongated terminal connector electrically connect each battery cell of the plurality of battery cells in a series configuration to transmit energy stored within each battery cell of the plurality of battery cells to a component of a vehicle while replacing a conventional bus bar module.

As used herein, the term "communicatively coupled" means that coupled components are capable of exchanging data signals with one another such as, for example, electrical signals via conductive medium or a non-conductive medium, and the like.

As used herein, the term "longitudinal direction" refers to the forward-rearward direction of the battery pack (i.e., in the +/−Y-direction depicted in FIG. 1). The term "lateral direction" refers to the cross-direction of the battery pack (i.e., in the +/−X-direction depicted in FIG. 1), and is transverse to the longitudinal direction. The term "vertical direction" or "up" or "above" refer to the upward-downward direction of the battery pack (i.e., in the +/−Z-direction depicted in FIG. 1).

Vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein. Furthermore, the vehicle may be a hybrid vehicle, an electric vehicle, a conventional vehicle, and the like.

Referring to FIGS. 1-3, a vehicle 10 including a passenger compartment 12 is shown. The passenger compartment 12 includes a seat and a seat frame 14. The seat frame 14 incudes a seat portion 16 and a seat back portion 18. A battery pack assembly 20 is positioned within the seat portion 16 of the seat frame 14. It should be appreciated that the battery pack assembly 20 may be positioned anywhere within the passenger compartment 12, an engine compartment, and the like, within the vehicle 10.

The battery pack assembly 20 includes a housing 22 that houses a plurality of battery cells 24. It should be appreciated that while the plurality of battery cells 24 are illustrated as being in two rows in the lateral direction (i.e. in the +/−X direction), the plurality of battery cells 24 may be positioned within the housing 22 in a plurality of configurations and arrangements in other embodiments. As a non-limiting example, the plurality of battery cells 24 may be positioned within the housing 22 in a column configuration or in the longitudinal direction (i.e., in the +/−Y direction). The housing 22 includes a pair of end retaining walls 26 and a pair of side retaining walls 28 that define a housing interior portion 30 that includes a floor surface 32. In some embodiments, the end retaining walls 26 and the side retaining walls 28 each extend in the vertical direction (i.e., in the +/−Z direction). Further, in some embodiments, the end retaining walls 26 each extend in the vertical direction (i.e., in the +/−Z direction) a greater distance than the side retaining walls 28. The side retaining walls 28 further include an outer surface 28a that is positioned outside of each of the plurality of battery cells 24 positioned within the housing interior portion 30 of the housing 22.

The battery pack assembly 20 further includes a cooling mechanism 34. The cooling mechanism 34 forces airflow above and/or beneath each battery cell 24a of the plurality of battery cells 24 to cool the plurality of battery cells 24.

Referring to FIGS. 1 and 2A, the battery pack assembly 20 further includes a plurality of pairs of elongated terminal connectors 36 extending across a length of the plurality of battery cells 24 in the longitudinal direction (i.e., in the +/−Y direction). It should be appreciated that the elongated terminal connectors 36 extend in a direction transverse to the plurality if battery cells 24. As a non-limiting example, in the column configuration, the elongated terminal connectors 36 extend in the longitudinal direction (i.e., in the +/−Y direction). As another non-liming example, when the plurality of battery cells 24 are arranged in a row configuration, as shown in FIG. 1, the elongated terminal connectors 36 extend in the longitudinal direction (i.e., in the +/−Y direction).

The elongated terminal connectors 36 assist in retaining the plurality of battery cells 24 within the housing 22. Further, the elongated terminal connectors 36 provide a conductive medium such that an energy stored in of each of the plurality of battery cells 24 may be carried through the elongated terminal connectors 36 to a different component of the vehicle 10, such as a powertrain, an inverter, and the like, as discussed in greater detail herein.

Each of the plurality of battery cells 24 are communicatively coupled in series with each other. It should be understood that each row is communicatively coupled to other rows such that each battery cell 24a of the plurality of battery cells 24 are communicatively coupled in series. As such, adjacent battery cells 24b, 24c of the plurality of battery cells 24 are positioned or arranged such that the polarity of the adjacent battery cells 24b, 24c is reversed compared to the adjacent battery cell 24b. That is, in a non-liming example, the battery cell 24a is arranged within the housing 22 with a positive terminal nearest to the outer surface 28a of the side retaining walls 28 of the housing 22 while a negative terminal is nearest to the housing interior portion 30 of the housing 22. The adjacent battery cells 24b, 24c are each arranged within the housing 22 with a positive terminal nearest to the housing interior portion 30 of the housing 22 while a negative terminal is nearest to the outer surface 28a of the side retaining walls 28 of the housing 22. As such, it is understood that the positive terminal of each of the plurality of battery cells 24 alternates such that every other battery cell has the same positive terminal polarity arrangement, and the same applies for each negative terminal of the plurality of battery cells 24.

A pair of load wires 38a, 38b are communicatively coupled to the plurality of battery cells 24 through the elongated terminal connectors 36 such that an energy stored within the plurality of battery cells 24 may be transferred from the plurality of battery cells 24 to another component of the vehicle 10 via the elongated terminal connectors 36 and the pair of load wires 38a, 38b. It should be understood that the energy stored and/or transferred may be a voltage, a current, a power, and the like. It should be appreciated that the pair of load wires 38a, 38b may be a busbar, a wire, or other conductive medium that transfers the energy stored within the plurality of battery cells 24 to the components of the vehicle 10. In some embodiments, the component of the vehicle 10 may be a powertrain component. In other embodiments, the vehicle component is an inverter, a relay, fuses, other electrical components, and the like.

Referring now to FIG. 3, an isolated view of the battery cell 24a of the plurality of battery cells 24 is schematically depicted. It should be understood that while only the battery cell 24a of the plurality of battery cells 24 is described, the features apply to each battery cell of the plurality of battery cells 24. The battery cell 24a includes a terminal side 40a and an opposite housing side 40b. Further, the battery cell 24a includes a terminal surface 44a, on the terminal side 40a, and a housing surface 44b that, in some embodiments, abuts the floor surface 32 of the housing 22. In other embodiments, the housing surface 44b is adjacent to the floor surface 32 of the housing 22. As such, in this embodiment, the battery cell 24a may not be in contact with the floor surface 32 of the housing 22. In other embodiments, portions of the housing surface 44b are in contact with portions of the floor surface 32 of the housing 22.

In some embodiments, a pair of terminals 42 extends from the terminal surface 44a of the battery cell 24a on the terminal side 40a. One of the pair of terminals 42 is generally known as a positive terminal, and the other terminal of the pair of terminals 42 is generally known as a negative terminal. The pair of terminals 42 are each provided with a post 46 that extends upwardly from the terminal surface 44a of the battery cell 24a in the vertical direction (i.e., in the +/−Z direction). In some embodiments, the post 46 may be cylindrical and has a post diameter D1. In other embodiments, the post 46 may be a square, a rectangle, an octagon, and the like. As such, it should be appreciated that the post 46 may be a uniform shape or a non-uniform shape. Further, in some embodiments, each post 46 of the pair of terminals 42 extends an equal length from the terminal surface 44a in the vertical direction (i.e., in the +/−Z direction). In other embodiments, one post 46 of the pair of terminals 42 extends from the terminal surface 44a in the vertical direction (i.e., in the +/−Z direction), a different height that the other post 46 of the pair of terminals 42. As a non-limiting example, each negative post may extend a height greater than the positive posts in the vertical direction (i.e., in the +/−Z direction). In other embodiments, each positive post may extend a height greater than the negative posts in the vertical direction (i.e., in the +/−Z direction).

Furthermore, in various embodiments, some battery cells of the plurality of battery cells 24 may extend a height greater than the other battery cells of the plurality of battery cells 24 in the vertical direction (i.e., in the +/−Z direction). As a non-limiting example, one row of battery cells of the plurality of battery cells 24 may be at a height greater than the other battery cells of the plurality of battery cells 24 in other rows in the vertical direction (i.e., in the +/−Z direction). In other embodiments, some battery cells within a row in the lateral direction (i.e., in the +/−Y direction) may also be at a height greater than the other battery cells in the same row in the vertical direction (i.e., in the +/−Z direction). As a non-limiting example, every other battery cell may be at a height greater than the adjacent battery cell in the vertical direction (i.e., in the +/−Z direction). It should be understood that the above are non-limiting examples and that each battery cell of the plurality of battery cells may be in any configuration in any direction, such as angled, in varying heights, and the like.

Each post 46 of the pair of terminals 42 includes a distal end 48a and a proximate end 48b. The proximate end 48b abuts the terminal surface 44a. The distal end 48a is opposite the proximate end 48b. A flange 50 extends radially outward from the distal end 48a of the post 46. In some embodiments, the flange 50 may be generally circular and has a flange diameter D2. In other embodiments, the flange 50 may be a square, a rectangle, an octagon, and the like. As such, it should be appreciated that the flange 50 may be a uniform shape or a non-uniform shape. The flange diameter D2 may be larger than the post diameter D1 of each post 46.

The size and shape of the battery cell 24a may depend on predetermined specifics such as the amount of energy to be stored, a temperature response of the battery cell, an amount of energy the vehicle requires, and the like. As such, the type of the battery cell 24a may vary. In some embodiments, the battery cell 24a is lithium ion (LI-Ion). In other embodiments, the battery cell 24a is a Molten Salt (Na—NiCl2), a Nickel Metal Hydride (Ni-MH), a Lithium Sulphur (Li—S), and the like.

Figure 4:
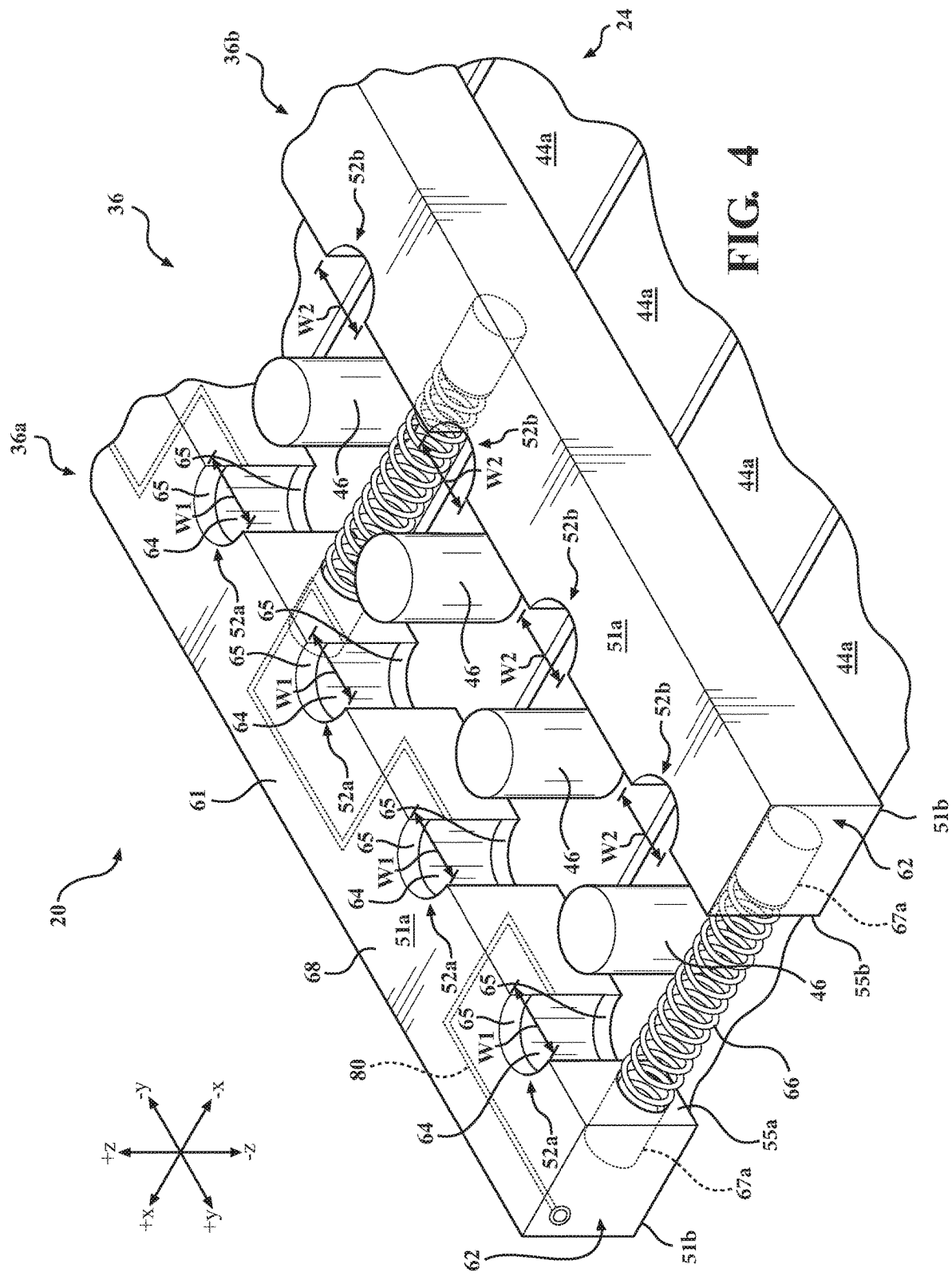
FIG. 4 schematically depicts a partial perspective view of the battery pack assembly of FIG. 1 with a pair of elongated terminal connectors in a disengaged position according to one or more embodiments described herein.

Referring to FIGS. 1-2A and 4, the pairs of elongated terminal connectors 36 will now be described. Each pair of elongated terminal connectors 36 includes a first elongated terminal connector 36a and a second elongated terminal connector 36b. As described in greater detail below, the first elongated terminal connector 36a and the second elongated terminal connector 36b are moveable between an engaged position, as shown in FIGS. 1 and 2A, and a disengaged position, as shown in FIG. 4. The first elongated terminal connector 36a and the second elongated terminal connector 36b each have a pair of end portions 62 and a middle portion 61 disposed between the pair of end portions 62.

Each row of the plurality of battery cells 24 includes two pairs of elongated terminal connectors 36. In some embodiments, each row of terminals 42 includes a pair of elongated terminal connectors 36. Each row of one of the pair of terminals 42 includes a pair of elongated terminal connectors 36, specifically, a first elongated terminal connector 36a and a second elongated terminal connectors 36b. As such, each row of the plurality of battery cells 24 includes a first pair of elongated terminal connectors 36 and a second pair elongated terminal connectors 36'. Each pair of elongated terminal connectors 36 includes a first elongated terminal connector 36a and a second elongated terminal connector 36b such that each row of battery cells 24 includes a total of four elongated terminal connectors. In some embodiments, the first pair of elongated terminal connectors 36 are referred to as a first elongated terminal connector 36a and a second elongated terminal connector 36b, and the second pair of elongated terminal connectors 36' are referred to as a third elongated terminal connector 36a' and a fourth elongated terminal connector 36b'. As the structure of the first pair of elongated terminal connectors 36 corresponds to the second pair of elongated terminal connectors 36', discussion will be limited to the first pair of elongated terminal connectors 36 which will be referred to as elongated terminal connectors 36.

The elongated terminal connectors 36 extend along the terminal side 40a of the plurality of battery cells 24 in a direction, or pattern, transverse to the pair of terminals 42 of each battery cell 24a of the plurality of battery cells 24. That is, in some embodiments, when the pair of terminals 42 are arranged along the terminal surface 44a in the lateral direction (i.e., in the +/−X direction) as illustrated, the elongated terminal connectors 36 extend in the longitudinal direction (i.e., in the +/−Y direction). In other embodiments, when the pair of terminals 42 are arranged along the terminal surface 44a in the longitudinal direction, (i.e., in the +/− Y direction), the elongated terminal connectors 36 extend in the lateral direction (i.e., in the X direction).

Referring FIGS. 1 and 2A-2B, the elongated terminal connectors 36 include at least one opening 70 positioned at one end portion 62 of the elongated terminal connectors 36. In some embodiments, the opening 70 is formed in one of the first elongated terminal connector 36a or the second elongated terminal connector 36b. In some embodiments, the first elongated terminal connector 36a includes a first opening recess and the second elongated terminal connector 36b includes a second opening recess that when the first elongated terminal connector 36a and the second elongated terminal connector 36b are in the engaged position the first opening recess and the second opening recess abut to form the opening 70. The at least one opening 70 is configured to receive a fastener 72 such as a bolt, a screw, a rivet, and the like. In some embodiments, the at least one opening 70 is internally threaded to assist in retaining the fastener 72. In other embodiments, the at least one opening 70 is a through hole. As described in greater detail below, the fastener 72 is received within an aperture 78 formed in the end retaining walls 26 to secure the elongated terminal connectors 36 to the housing 22. In some embodiments, the opening 70 extends between the upper surface 51a and the lower surface 51b of the first elongated terminal connector 36a and the second elongated terminal connector 36b and the opening 70 may be internally threaded to engage the fastener 72. In some embodiments, the aperture 78 formed in the end retaining walls 26 of the housing 22 is internally threaded to engage the fastener 72. The opening 70 aligns with the aperture 78 when the first elongated terminal connectors 36a and the second elongated terminal connector 36b are in an engaged position as described below. The engagement of the fastener 72 within the opening 70 and the aperture 78 positions the first elongated terminal connectors 36a and the second elongated terminal connector 36b in a locked position. In the locked the position, the first elongated terminal connectors 36a and the second elongated terminal connector 36b are locked into the engaged position such that the first elongated terminal connectors 36a and the second elongated terminal connector 36b are inhibited from being linearly displaced in the longitudinal direction, the lateral direction, or the vertical direction from the engaged position to the disengaged position.

Referring to FIG. 4, each of the first elongated terminal connector 36a and the second elongated terminal connector 36b include an upper surface 51a and an opposite lower surface 51b that faces the terminal surface 44a of the plurality of battery cells 24. In some embodiments, the lower surface 51b is in contact with the terminal surface 44a of the plurality of battery cells 24. The first elongated terminal connector 36a includes a plurality of first recesses 52a, and the second elongated terminal connector 36b includes a plurality of second recesses 52b.

The plurality of first recesses 52a have a first width W1, and the plurality of second recesses 52b have a second width W2. In some embodiments, the first width W1 is equal to the second width W2. In other embodiments, the first width W1 is not equal to the second width W2. In some embodiments, the first width W1 and the second width W2 may be greater than or equal to the post diameter D1, thereby enabling the post 46 to be received within the plurality of first recesses 52a and the plurality of second recesses 52b when the battery pack assembly 20 is in an engaged position, as discussed in greater detail herein.

Still referring to FIG. 4, the plurality of first recesses 52a and the plurality of second recesses 52b have a shape corresponding to an outer peripheral shape of the posts 46 of the terminals such that the plurality of first recesses 52a and the plurality of second recesses 52b are configured to receive a portion of the post 46 of a corresponding terminal 42 when the first elongated terminal connector 36a and the second elongated terminal connector 36b are in the engaged position. In some embodiments and as illustrated in FIG. 4, the plurality of first recesses 52a and the plurality of second recesses 52b have a semi-spherical or semi-cylindrical shape to accommodate the generally cylindrical shape of the post 46.

With reference to FIG. 4, each of the plurality of first recesses 52a extend through a thickness of the first elongated terminal connector 36a between the upper surface 51a and the lower surface 51b. Similarly, each of the plurality of second recesses 52b extend through a thickness of the second elongated terminal connector 36b between the upper surface 51a and the lower surface 51b. While each of the plurality of first recesses 52a and the plurality of second recesses 52b are shown as extending through the thickness of the first elongated terminal connector 36a and the second elongated terminal connector 36b, respectively, it should be understood that one of the plurality of first recesses 52a and the plurality of second recesses 52b may extend through a different thickness of the first elongated terminal connector 36a and the second elongated terminal connector 36b, respectively. Furthermore, while the thickness is shown as uniform along the entirety of the first elongated terminal connector 36a and the second elongated terminal connector 36b in the longitudinal direction (i.e., in the +/−Y direction), the thickness, may be non-uniform in the longitudinal direction (i.e., in the +/−Y direction) in other embodiments. As a non-limiting example, the thickness may be greater at each end portion 62 of the first elongated terminal connector 36a and the second elongated terminal connector 36b than the middle portion 61 of the first elongated terminal connector 36a and the second elongated terminal connector 36b.

Still referring to FIG. 4, each of the plurality of first recesses 52a and the plurality of second recesses 52b include a conductive portion 64 positioned between a pair of insulating portions 65. The conductive portions 64 provide a path for transmitting the energy stored within each of the plurality of battery cells 24 to the pair of load wires 38a, 38b for use by components of the vehicle 10. As such, in some embodiments, each of the conductive portions 64 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like.

In some embodiments, the pair of insulating portions 65 each includes an insulating material, such as a thermoplastic such as a polyetheretherkeytone (PEEK), a plastic such as polypropylene, polyvinyl chloride (PVC), Polybutylene Terephthalate (PET), and the like. It should be understood that the conductive portion 64 and the pair of insulating portions 65 may be positioned at various locations within each of the plurality of first recesses 52a and the plurality of second recesses 52b.

In some embodiments, at least one biasing member 66 is positioned between and coupled to the first elongated terminal connector 36a and the second elongated terminal connector 36b. As shown in FIG. 4, the at least one biasing member 66 includes a plurality of biasing members 66. The plurality of biasing members 66 extend between the first elongated terminal connector 36a and the second elongated terminal connector 36b. In some embodiments, one end of the plurality of biasing members 66 is received within a cavity 67a formed in first elongated terminal connector 36a and an opposite end of the plurality of biasing members 66 is received within a cavity 67b formed in the second elongated terminal connector 36b. The plurality of biasing members 66 bias the first elongated terminal connector 36a and the second elongated terminal connector 36b towards the engaged position. The plurality of biasing members 66 include a biasing force that biases the first elongated terminal connector 36a and the second elongated terminal connector 36b towards each other in the engaged position. In some embodiments, the plurality of biasing members 66 are springs such as tension springs, an elastomeric material, or other material configured to apply a biasing force to bias the first elongated terminal connector 36a and the second elongated terminal connector 36b towards each other in the engaged position.

In some embodiments, a first side face 55a of the first elongated terminal connector 36a abuts a second side face 55b of the second elongated terminal connector 36b in the engaged position. In some embodiments, the first side face 55a of the first elongated terminal connector 36a is spaced apart from the second side face 55b of the second elongated terminal connector 36b by a first distance in the engaged position, and the first side face 55a of the first elongated terminal connector 36a is spaced apart from the second side face 55b of the second elongated terminal connector 36b a second distance greater than the first distance in the disengaged position.

The first elongated terminal connector 36a and the second elongated terminal connector 36b each include an insulating portion 68 that is generally formed of an insulating material. In some embodiments, the insulating portion 68 includes a thermoplastic such as a polyetheretherkeytone (PEEK), a plastic such as polypropylene, polyvinyl chloride (PVC), Polybutylene Terephthalate (PET), and the like. It should be appreciated that, in some embodiments, the elongated terminal connectors 36 may have a plurality of layers of the thermoplastic material, the plastic material, and the like, arranged in the vertical direction (i.e., in the +/−Z direction) with different materials between the layers, such as a conductive material, as discussed in greater detail herein.

In the engaged position of the battery pack assembly 20, the plurality of biasing members 66 bias, using an inwardly biasing force, the first elongated terminal connector 36a and the second elongated terminal connector 36b inwardly to retain the plurality of terminals 42 within the plurality of first recesses 52a and the plurality of second recesses 52b, as discussed in greater detail herein. In the disengaged position of the battery pack assembly 20, the plurality of biasing members 66 bias, using an outwardly biasing force, the first elongated terminal connector 36a and the second elongated terminal connector 36b outwardly, thereby enabling an operator to remove the elongated terminal connector 36 and subsequently remove the plurality of battery cells 24, as discussed in greater detail herein. In some embodiments, the plurality of biasing members 66 is a plurality of springs. It should be understood that the plurality of biasing members 66 may include any other device configured to bias the first elongated terminal connector 36a and the second elongated terminal connector 36b inwardly and outwardly in response to a corresponding biasing force.

The first elongated terminal connector 36a and the second elongated terminal connector 36b each include an insulating portion 68 that is generally formed of an insulating material. In some embodiments, the insulating portion 68 includes a thermoplastic such as a polyetheretherkeytone (PEEK), a plastic such as polypropylene, polyvinyl chloride (PVC), Polybutylene Terephthalate (PET), and the like. It should be appreciated that, in some embodiments, the elongated terminal connectors 36 may have a plurality of layers of the thermoplastic material, the plastic material, and the like, arranged in the vertical direction (i.e., in the +/−Z direction) with different materials between the layers, such as a conductive material, as discussed in greater detail herein.

Still referring to FIG. 4, each of the conductive portions 64 is communicatively coupled to a conductive path 80, which extends through the first elongated terminal connector 36a and the second elongated terminal connector 36b. As such, it should be appreciated that the conductive path 80 is communicatively coupled to each of the plurality of first recesses 52a of the first elongated terminal connector 36a and the plurality of second recesses 52b of the second elongated terminal connector 36b. The conductive path 80 is configured to connect conductive portions 64 to the pair of load wires 38a, 38b. As such, in some embodiments, the conductive path 80 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like. As such, the energy flows from the plurality of battery cells 24 to the component through a path defined by the terminals 42, the conductive portions 64, the conductive path 80, and the pair of load wires 38a, 38b.

In some embodiments, the conductive path 80 is positioned between the upper surface 51a and the lower surface 51b of the elongated terminal connector 36. That is, the conductive path 80 extends through the elongated terminal connector 36 such that the conductive path 80 is sandwiched between insulating materials. As such, the conductive path 80 is electrically insulated from any component above or below, in front or behind, and on both sides of the elongated terminal connector 36. The conductive path 80 includes portions that extend in the lateral direction (i.e., in the +/−X direction) and in the longitudinal direction (i.e., in the +/−Y direction) and has a thickness in the vertical direction (i.e., in the +/−Z direction).

In various embodiments, the conductive path 80 in one of the first elongated terminal connectors 36a and second elongated terminal connector 36b is configured to communicatively couple a positive polarity terminal from the battery cell 24a of the plurality of battery cells 24 to a negative polarity terminal of the adjacent battery cell 24c of the plurality of battery cells 24. The conductive path 80 of the other one of the first elongated terminal connectors 36a and the second elongated terminal connector 36b is configured to communicatively couple a negative polarity terminal from the adjacent battery cell 24c of the plurality of battery cells 24 to a positive polarity terminal of a second adjacent battery cell 24d of the plurality of battery cells 24.

In other embodiments, the conductive path 80 in one of the first elongated terminal connectors 36a and the second elongated terminal connector 36b is configured to communicatively couple a negative polarity terminal from the battery cell 24a of the plurality of battery cells 24 to a positive polarity terminal of the adjacent battery cell 24c of the plurality of battery cells 24. The conductive path 80 of the other one of the first elongated terminal connectors 36a and the second elongated terminal connector 36b is configured to communicatively couple a positive polarity terminal from the adjacent battery cell 24c of the plurality of battery cells 24 to a negative polarity terminal of a second adjacent battery cell 24d of the plurality of battery cells 24.

As such, it should be understood that the conductive path 80 completes or closes an electrical circuit between adjacent battery cells of the plurality of battery cells 24 such that the conductive paths 80 of the first pair of elongated terminal connectors 36 daisy chain, or electrically positions the plurality of battery cells 24 into a series configuration. That is, the elongated terminal connectors 36 together electrically position the plurality of battery cells 24 into a series configuration such that the energy stored in each battery cell of the plurality of battery cells 24 is maximized for transfer to other components of the vehicle 10. In some embodiments, the conductive path 80 may further include a continuous portion (not shown) that extends the length of elongated terminal connectors 36 and which is communicatively coupled to the conductive path 80.

Referring to FIGS. 1-2A and 4, the first elongated terminal connector 36a and the second elongated terminal connector 36b are movable between the engaged position and the disengaged position. In the engaged position, the first elongated terminal connectors 36a and the second elongated terminal connector 36b retain the plurality of battery cells 24 to the battery pack. As a non-limiting example and with reference to FIG. 4, to achieve the engaged position, the elongated terminal connectors 36 are inwardly displaced in the lateral direction (i.e., in the +/−X direction) by an inwardly biasing force of the plurality of biasing members 66. As such, each of the plurality of first recesses 52a engages a first side of the respective post 46, and each of the plurality of second recesses 52b engages a second side of the respective post 46 in the engaged position. In the engaged position, the path between the component and the plurality of battery cells 24 is formed due to the terminals 42 being received within the plurality of first recesses 52a and the plurality of second recesses 52b. Specifically, in the engaged position, the terminals 42 contact the conductive portions 64 of the plurality of first recesses 52a and the plurality of second recesses 52b such that the first elongated terminal connector 36a and the second elongated terminal connector 36b are electrically coupled to the plurality of battery cells 24 though each of the posts 46 of the terminals 42.

In order to move the first elongated terminal connector 36a and the second elongated terminal connector 36b from the engaged position to the disengaged position, one or both of the first elongated terminal connector 36a and the second elongated terminal connector 36b are linearly displaced to move the first elongated terminal connector 36a away from the second elongated terminal connector 36b upon overcoming the biasing force of the plurality of biasing members 66. Specifically, to achieve the disengaged position, the elongated terminal connector 36a and the second elongated terminal connector 36b are outwardly displaced in the lateral direction (i.e., in the +/−X direction) by displacing each of the first elongated terminal connector 36a and the second elongated terminal connector 36b in opposite directions.

In the disengaged position, the first elongated terminal connector 36a and the second elongated terminal connector 36b are disengaged from and spaced apart from the terminals 42. Specifically, in the disengaged position, the first elongated terminal connector 36a and the second elongated terminal connector 36b are displaced such that the terminals 42 are no longer received within and engaged with the plurality of first recesses 52a and the plurality of second recesses 52b. In the disengaged position, the first elongated terminal connector 36a and the second elongated terminal connector 36b can be removed from the battery pack assembly 20 to release the plurality of battery cells 24. That is, in the disengaged position, the post 46 of the pair of terminals 42 are disengaged from the plurality of first recesses 52a and the plurality of second recesses 52b. In the disengaged position, the posts 46 of the terminals 42 are disengaged from the first elongated terminal connector 36a and the second elongated terminal connector 36b such that the posts 46 are spaced apart from the plurality of first recesses 52a and the plurality of second recesses 52b in order to inhibit electrical communication between the terminals 42 of the battery cells 24 and the first elongated terminal connector 36a and the second elongated terminal connector 36b. As the posts 46 of the terminals 42 are disengaged from the first elongated terminal connector 36a and the second elongated terminal connector 36b, the first elongated terminal connector 36a and the second elongated terminal connector 36b may be removed from the battery pack assembly 20 by displacing the first elongated terminal connector 36a and the second elongated terminal connector 36b upwardly in a removal direction that extends generally parallel with the vertical direction. Upon removal of the first elongated terminal connector 36a and the second elongated terminal connector 36b, an individual battery cell 24a may be removed from the battery pack assembly 20.

Figure 5:
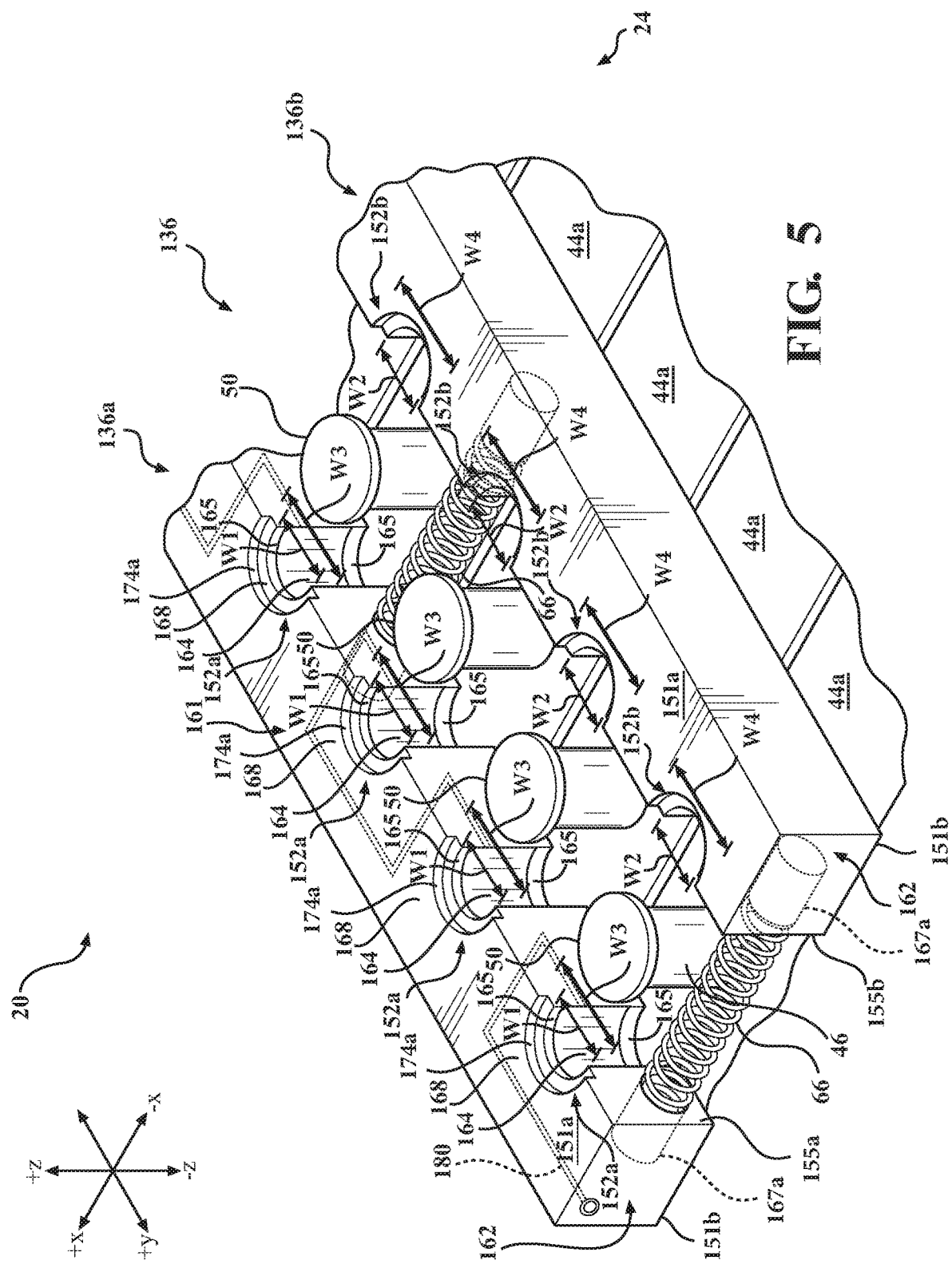
FIG. 5 schematically depicts a partial perspective view of the battery pack assembly of FIG. 1 with another pair of elongated terminal connectors in the disengaged position according to one or more embodiments described herein.

Now referring to FIG. 5, a second aspect of the elongated terminal connectors 136 is schematically depicted. It is understood that the elongated terminal connectors 136 are similar to the elongated terminal connectors 36 with the exceptions of the features described herein. As such, like features will use the same reference numerals with a prefix "1" for the reference numbers. As such, for brevity reasons, these features will not be described again.

As shown in FIG. 5, the terminals 42 of the plurality of battery cells 24 include flanges 50 extending radially outwardly from the distal end 48a of the post 46. Each of the plurality of first recesses 152a of the first elongated terminal connector 136a includes first collar portions 174a formed at the upper surface 151a of the first elongated terminal connector 136a. The first collar portions 174a are in communication with the plurality of first recesses 152a and open at the upper surface 151a of the first elongated terminal connector 136a. The first collar portions 174a have a generally cylindrical shape having a width W3 that is greater than the width W1 of the plurality of first recesses 152a. The width W3 is set to be equal to or greater than the diameter D2 of the flanges 50 of the posts 46 of the terminals.

Each of the plurality of second recesses 152b of the second elongated terminal connector 136b includes second collar portions 174b formed at the upper surface 151b of the second elongated terminal connector 136b. The second collar portions 174b are in communication with the plurality of second recesses 152b and open at the upper surface 151b of the second elongated terminal connector 136b. The second collar portions 174b have a generally cylindrical shape having a width W4 that is greater than the width W2 of the plurality of second recesses 152b. The width W4 is set to be equal to or greater than the diameter D2 of the flanges 50 of the posts 46 of the terminals.

The first collar portions 174a and the second collar portions 174b are configured to receive and engage with the flanges 50 when the first elongated terminal connector 136a and the second elongated terminal connector 136b are in the engaged position. The first collar portions 174a and the second collar portions 174b are configured to be spaced apart and disengaged from the flanges 50 when the first elongated terminal connector 136a and the second elongated terminal connector 136b are in the disengaged position.

The first collar portions 174a are formed as shoulder portions between the plurality of first recesses 152a and the upper surface 151a of the first elongated terminal connector 136a. The second collar portions 174b are formed as shoulder portions between the plurality of second recesses 152b and the upper surface 151b of the second elongated terminal connector 136b.

Figure 6:
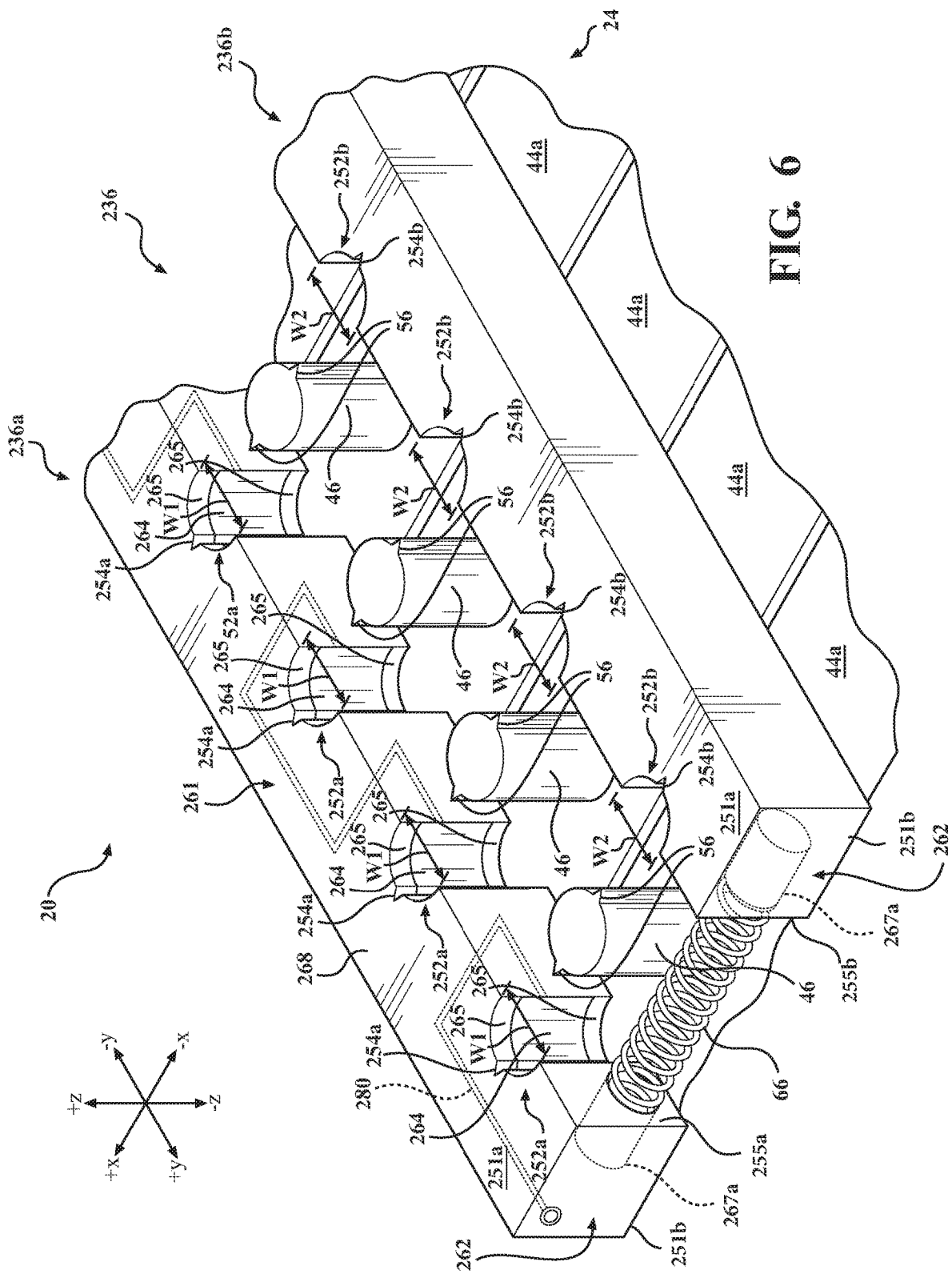
FIG. 6 schematically depicts a partial perspective view of the battery pack assembly of FIG. 1 with another pair of elongated terminal connectors in the disengaged position according to one or more embodiments described herein.

Now referring to FIG. 6, a third aspect of the elongated terminal connectors 236 is schematically depicted. It is understood that the elongated terminal connectors 236 are similar to the elongated terminal connectors 36 with the exceptions of the features described herein. As such, like features will use the same reference numerals with a prefix "2" for the reference numbers. As such, for brevity reasons, these features will not be described again.

As shown in FIG. 6, the terminals 42 of the plurality of battery cells 24 include a pair of protrusions 56 extending radially outwardly from opposite sides of the posts 46. The plurality of first recesses 252a include a first notch 254a and the plurality of second recesses 252b include a second notch 254b. The first notches 254a and the second notches 254b have a shape that corresponds to the shape of the protrusions 56 of the posts 46. In some embodiments, the first notches 254a and the second notches 254b have generally V-shapes that taper away from the first face 255a and the second face 255b of the first elongated terminal connector 236a and the second elongated terminal connector 236b, respectively, and the pair of protrusions 56 have a generally V-shape that tapers outwardly from the posts 46.

The first notches 254a and the second notches 254b are configured to receive and engage with the pair of protrusions 56 when the first elongated terminal connector 236a and the second elongated terminal connector 236b are in the engaged position. The first notches 254a and the second notches 254b are configured to be spaced apart and disengaged from the pair of protrusions 56 when the first elongated terminal connector 236a and the second elongated terminal connector 236b are in the disengaged position.

Figure 7:
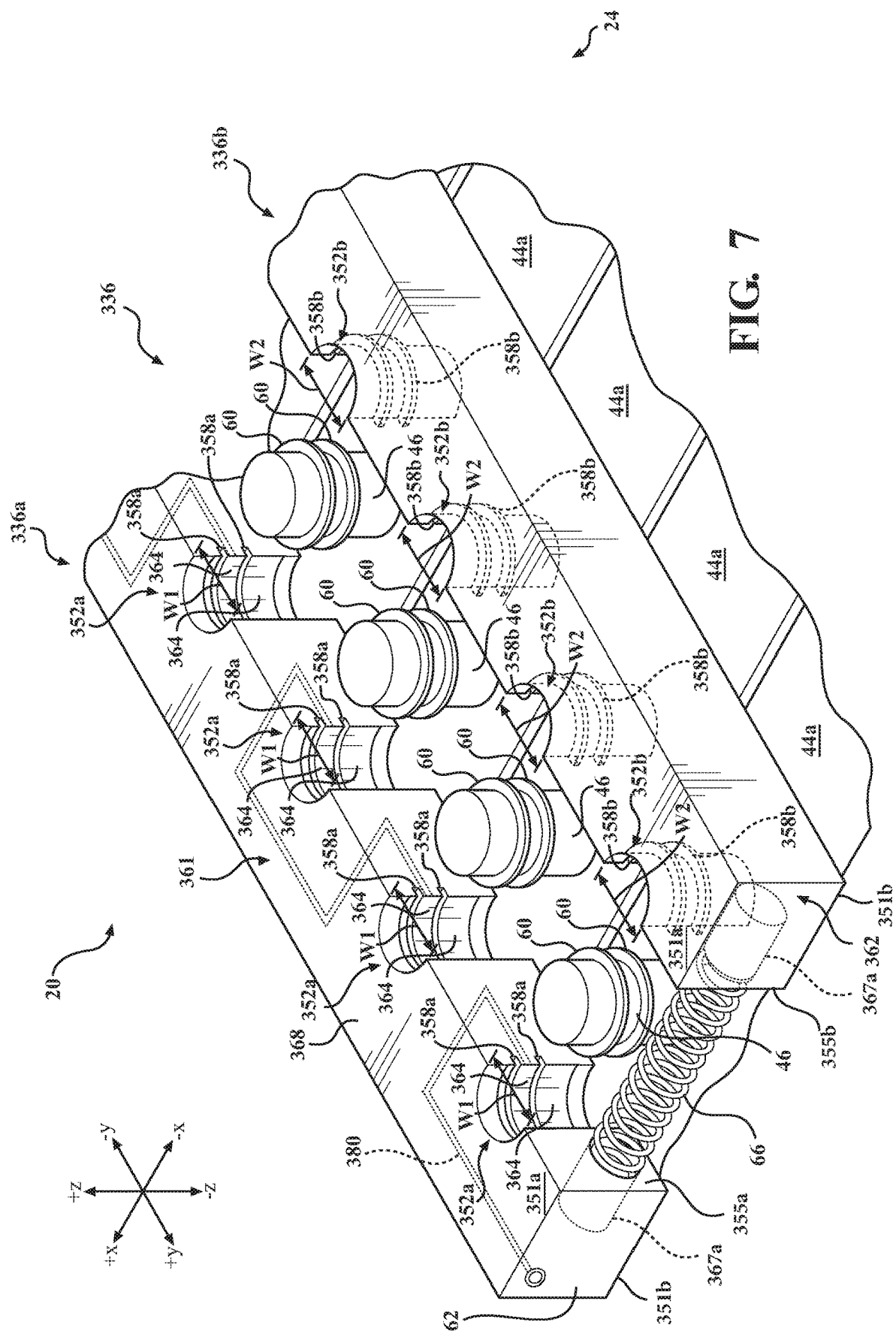
FIG. 7 schematically depicts a partial perspective view of the battery pack assembly of FIG. 1 with another pair of elongated terminal connectors in the disengaged position according to one or more embodiments described herein.

Now referring to FIG. 7, a fourth aspect of the elongated terminal connectors 336 is schematically depicted. It is understood that the elongated terminal connectors 336 are similar to the elongated terminal connectors 36 with the exceptions of the features described herein. As such, like features will use the same reference numerals with a prefix "3" for the reference numbers. As such, for brevity reasons, these features will not be described again.

As shown in FIG. 6, the terminals 42 of the plurality of battery cells 24 include at least one rib 60 or a pair of ribs 60 that are spaced apart in the vertical direction. The ribs 60 are formed as annular rings that extends radially outwardly from the posts 46. The ribs 60 have a diameter that is greater than the diameter D1 of the posts 46. The ribs 60 may extend entirely around the posts 46 or may extend partially around the posts 46. The plurality of first recesses 352a include at least one or a pair of first slots 358a and the plurality of second recesses 352b include at least one or a pair of second slots 358b. The first slots 358a and the second slots 358b have a shape that corresponds to the shape of the ribs 60 of the posts 46. In some embodiments, the first slots 358a and second slots 358b have a generally semicircular shape having a width that is greater than the width W1 of the plurality of first recesses 352a and the width W2 of the plurality of second recesses 352b.

The first slots 358a and the second slots 358b are configured to receive and engage with the ribs 60 when the first elongated terminal connector 336a and the second elongated terminal connector 336b are in the engaged position. In the engaged position, the engagement of the ribs 60 within the first slots 358a and the second slots 358b inhibit movement of the first elongated terminal connector 336a and the second elongated terminal connector 336b in the vertical direction. The first slots 358a and the second slots 358b are configured to be spaced apart and disengaged from the ribs 60 when the first elongated terminal connector 336a and the second elongated terminal connector 336b are in the disengaged position.

Figure 8:
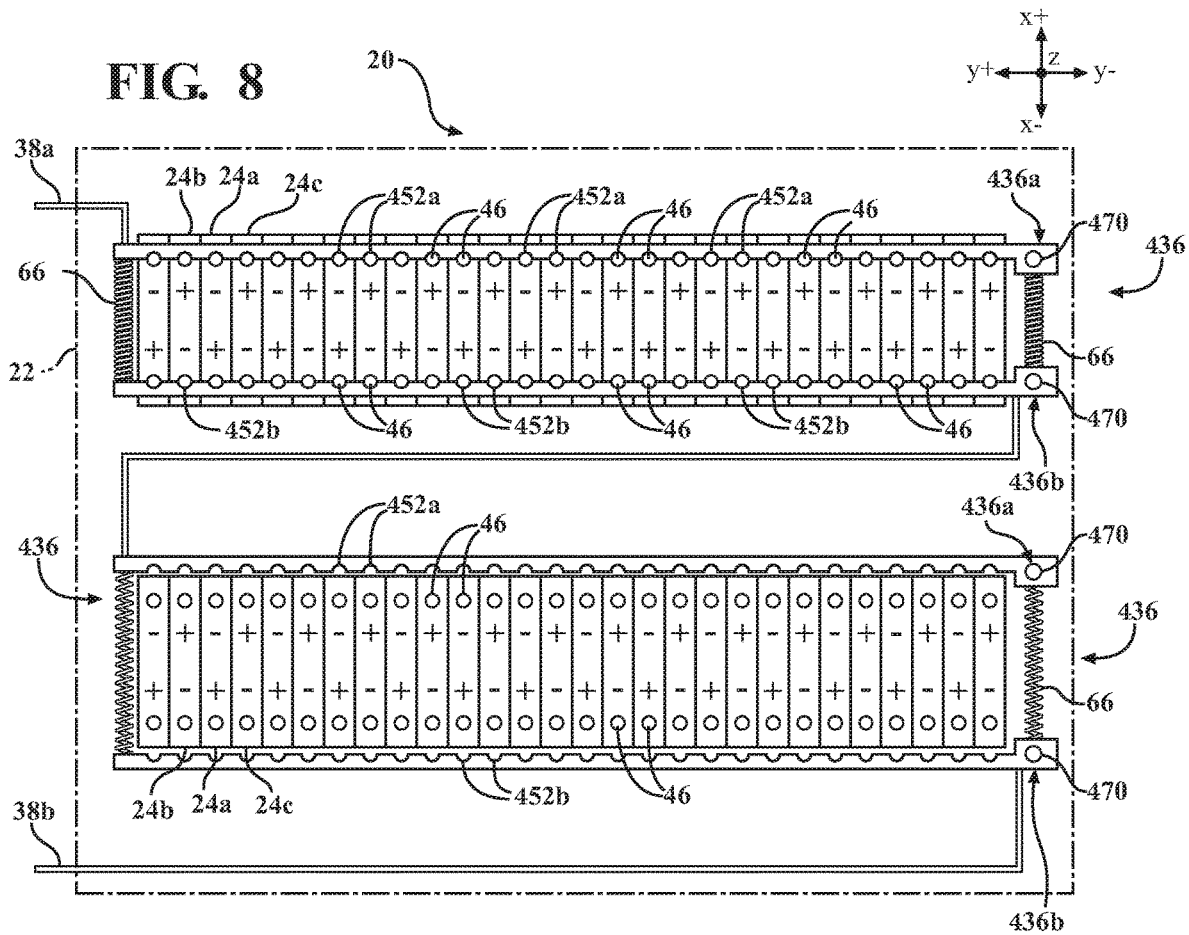
FIG. 8 schematically depicts a top view of the battery pack assembly with a pair of elongated terminal connectors in the engaged position and a pair of elongated terminal connectors in the disengaged position according to one or more embodiments shown or described herein.

Now referring to FIG. 8, a fifth aspect of the elongated terminal connectors 436 is schematically depicted. It is understood that the elongated terminal connectors 436 are similar to the elongated terminal connectors 36 with the exceptions of the features described herein. As such, like features will use the same reference numerals with a prefix "4" for the reference numbers. As such, for brevity reasons, these features will not be described again.

As shown in FIG. 8, each row of the plurality of battery cells 24 of the battery pack assembly 20 is provided with a first elongated terminal connector 436a and a second elongated terminal connector 436b. The first elongated terminal connector 436a includes a plurality of first recesses 452a and the second elongated terminal connector 436b includes a plurality of second recesses 452b. As shown in FIG. 8, the first elongated terminal connector 436a extends along one side of the plurality of battery cells 24 and the second elongated terminal connector 436b extends along an opposite side of the plurality of battery cells 24. As such, the plurality of first recesses 452a of the first elongated terminal connector 436a are configured to engage with the terminals 42 only along one side of the plurality of battery cells 24 in the engaged position and the plurality of second recesses 452b of the second elongated terminal connector 436b are configured to engage with the terminals 42 only along the other side of the plurality of battery cells 24 in the engaged position, as shown in the top row of battery cells 24 of FIG. 8. The first elongated terminal connector 436a and the second elongated terminal connector 436b are configured to be spaced apart and disengaged from the terminals 42 when the first elongated terminal connector 436a and the second elongated terminal connector 436b are in the disengaged position, as shown in the bottom row of battery cells 24 of FIG. 8.

It is appreciated, that the terminals 42, the first elongated terminal connector 436a, and the second elongated terminal connector 436b may have a configuration of the terminals and the elongated terminal connectors shown in FIGS. 4, 5, 6, and 7.

Figure 9:
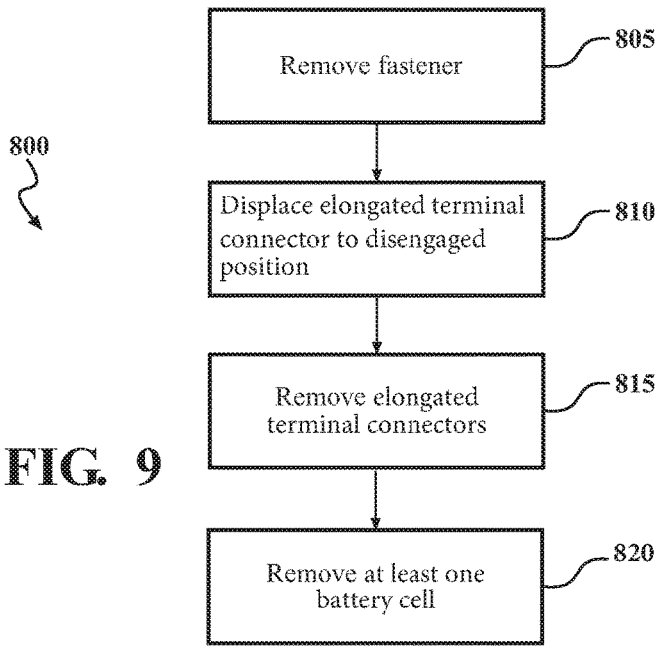
FIG. 9 depicts a flowchart of an illustrative method of removing a battery cell from a battery pack assembly of FIG. 1 according to one or more embodiments shown or described herein.

Now referring to FIG. 9, a flowchart of an illustrative method 800 of removing the battery cell from the battery pack assembly of FIG. 1 is depicted. The battery pack assembly is initially in an initial state in which the elongated terminal connectors are in the engaged position and the fastener engages with the openings and the apertures to position the elongated terminal connectors in the locked position. At block 805, the fastener that extends through the elongated terminal connectors are removed. At block 810, the elongated terminal connectors are displaced so as to move the elongated terminal connectors from the engaged position to the disengaged position such that each terminal of the battery cells are disengaged and spaced apart from the elongated terminal connectors. The elongated terminal connectors are displaced against a biasing force of the biasing member positioned between and coupled to the elongated terminal connectors. As a non-limiting example, a first elongated terminal connector is linearly displaced in a first direction, and a second elongated terminal connector is linearly displaced in a second, opposite direction such that the first elongated terminal connector and the second elongated terminal connector are neither electrically nor physically coupled to each of the at least one terminals of plurality of battery cells. At block 815, the elongated terminal connectors are removed upwardly in the vertical direction. At block 820, at least one battery cell of the plurality of battery cells is removed upwardly in the vertical direction from the battery pack assembly.

The above described battery pack assembly provide for elongated terminal connectors that electrically connect each of a plurality of battery cells to a vehicle component while retaining the plurality of battery cells within a housing. The elongated terminal connectors are easily removed by removing a fastener and by linearly displacing the elongated terminal connectors in an opposite direction of a biasing force of a biasing member from an engaged position to a disengaged position. Once the elongated terminal connectors are removed from the battery pack assembly, each battery cell of the plurality of battery cells may be removed from the battery pack assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
   a battery pack having a plurality of battery cells, each battery cell having a pair of terminals;
   a first elongated terminal connector having a plurality of first recesses;
   a second elongated terminal connector having a plurality of second recesses, the first elongated terminal connector and the second elongated terminal connector moveable between an engaged position and a disengaged position; and
   a biasing member extending between the first elongated terminal connector and the second elongated terminal connector, the biasing member biases the first elongated terminal connector and the second elongated terminal connector towards the engaged position,
   in the engaged position, the plurality of first recesses are engaged with at least one terminal of the pair of terminals of the plurality of battery cells and the plurality of second recesses are engaged with the at least one terminal of the pair of terminals of the plurality of battery cells, and
   in the disengaged position, the plurality of first recesses are disengaged from the at least one terminal of the pair of terminals of the plurality of battery cells and the plurality of second recesses are disengaged from the at least one terminal of the pair of terminals of the plurality of battery cells such that the first elongated terminal connector is spaced apart from the second elongated terminal connector.

2. The battery pack assembly of claim 1, wherein the first elongated terminal connector and the second elongated terminal connector are removable from the battery pack in the disengaged position.

3. The battery pack assembly of claim 1, wherein:
   each of the plurality of first recesses corresponds to a shape of a first side of the at least one terminal of the pair of terminals of the plurality of battery cells; and each of the plurality of second recesses corresponds to a shape of a second side opposite the first side of the at least one terminal of the pair of terminals of the plurality of battery cells.

4. The battery pack assembly of claim 1, wherein:
each of the plurality of first recesses includes a first collar portion and each of the plurality of second recesses includes a second collar portion,
the at least one terminal of the pair of terminals of the plurality of battery cells includes an upwardly extending post and a flange extending radially outward from a distal end of the post, and
in the engaged position the flange of the at least one terminal of the pair of terminals of the plurality of battery cells is received within the first collar portion of the plurality of first recesses and the second collar portion of the plurality of second recesses.

5. The battery pack assembly of claim 1, wherein:
each of the plurality of first recesses includes a first notch and each of the plurality of second recesses includes a second notch,
the at least one terminal of the pair of terminals of the plurality of battery cells includes an upwardly extending post and a pair of protrusions extending radially outward from a distal end of the post, and
in the engaged position one of the pair of protrusions of the at least one terminal of the pair of terminals of the plurality of battery cells is received within the first notch of the plurality of first recesses and the other of the pair of protrusions is received within the second notch of the plurality of second recesses.

6. The battery pack assembly of claim 1, wherein:
each of the plurality of first recesses includes a pair of first slots and each of the plurality of second recesses includes a pair of second slots,
the at least one terminal of the pair of terminals of the plurality of battery cells includes an upwardly extending post and a pair of ribs extending radially outward from a distal end of the post, and
in the engaged position a first portion of the pair of ribs of the at least one terminal of the pair of terminals of the plurality of battery cells is received within the pair of first slots of the plurality of first recesses and a second portion of the pair of ribs is received within the pair of second slots of the plurality of second recesses.

7. The battery pack assembly of claim 1, wherein the biasing member is a plurality of tension springs.

8. The battery pack assembly of claim 1, wherein the at least one terminal of the pair of terminals includes a pair of terminals, and in the engaged position, the plurality of first recesses of the first elongated terminal connector engages with one of the pair of terminals of the plurality of battery cells and the plurality of second recesses of the second elongated terminal connector engages with the other of the pair of terminals of the plurality of battery cells.

9. The battery pack assembly of claim 1,
wherein the battery pack assembly further comprises:
a third elongated terminal connector having a plurality of third recesses;
a fourth elongated terminal connector having a plurality of fourth recesses, the third elongated terminal connector and the fourth elongated terminal connector movable between an engaged position and a disengaged position; and
a secondary biasing member extending between the third elongated terminal connector and the fourth elongated terminal connector, the secondary biasing member biases the third elongated terminal connector and the fourth elongated terminal connector towards the engaged position,
in the engaged position, the plurality of third recesses are engaged with the other one of the pair of terminals of the plurality of battery cells, the plurality of fourth recesses are engaged with the other one of the pair of terminals of the plurality of battery cells, the plurality of first recesses are engaged with the at least one terminal of the pair of terminals of the plurality of battery cells, and the plurality of second recesses are engaged with the at least one terminal of the pair of terminals of the plurality of battery cells, and
in the disengaged position, the plurality of third recesses are disengaged from the other one of the pair of terminals of the plurality of battery cells, the plurality of fourth recesses are disengaged from the other one of the pair of terminals of the plurality of battery cells, the plurality of first recesses are disengaged from the at least one terminal of the pair of terminals of the plurality of battery cells, and the plurality of second recesses are disengaged from the at least one terminal of the pair of terminals of the plurality of battery cells.

10. A vehicle comprising:
a battery pack positioned within the vehicle, the battery pack having a plurality of battery cells, each battery cell having a pair of terminals;
a first elongated terminal connector having a plurality of first recesses;
a second elongated terminal connector having a plurality of second recesses, the first elongated terminal connector and the second elongated terminal connector moveable between an engaged position and a disengaged position; and
a biasing member extending between the first elongated terminal connector and the second elongated terminal connector, the biasing member biases the first elongated terminal connector and the second elongated terminal connector towards the engaged position,
in the engaged position, the plurality of first recesses are engaged with the at least one terminal of the pair of terminals of the plurality of battery cells and the plurality of second recesses are engaged with the at least one terminal of the plurality of battery cells, and
in the disengaged position, the plurality of first recesses are disengaged from the at least one terminal of the pair of terminals of the plurality of battery cells and the plurality of second recesses are disengaged from the at least one terminal of the pair of terminals of the plurality of battery cells such that the first elongated terminal connector is spaced apart from the second elongated terminal connector.

11. The vehicle of claim 10, wherein the first elongated terminal connector and the second elongated terminal connector are removable from the battery pack in the disengaged position.

12. The vehicle of claim 10, wherein:
each of the plurality of first recesses corresponds to a shape of a first side of the at least one terminal of the pair of terminals of the plurality of battery cells; and
each of the plurality of second recesses corresponds to a shape of a second side opposite the first side of the at least one terminal of the pair of terminals of the plurality of battery cells.

13. The vehicle of claim 10, wherein:
each of the plurality of first recesses includes a first collar portion and each of the plurality of second recesses includes a second collar portion,
the at least one terminal of the pair of terminals of the plurality of battery cells includes an upwardly extending post and a flange extending radially outward from a distal end of the post, and
in the engaged position the flange of the at least one terminal of the pair of terminals of the plurality of battery cells is received within the first collar portion of the plurality of first recesses and the second collar portion of the plurality of second recesses.

14. The vehicle of claim 10, wherein:
each of the plurality of first recesses includes a first notch and each of the plurality of second recesses includes a second notch,
the at least one terminal of the pair of terminals of the plurality of battery cells includes an upwardly extending post and a pair of protrusions extending radially outward from a distal end of the post, and
in the engaged position one of the pair of protrusions of the at least one terminal of the pair of terminals of the plurality of battery cells is received within the first notch of the plurality of first recesses and the other of the pair of protrusions is received within the second notch of the plurality of second recesses.

15. The vehicle of claim 10, wherein:
each of the plurality of first recesses includes a pair of first slots and each of the plurality of second recesses includes a pair of second slots,
the at least one terminal of the pair of terminals of the plurality of battery cells includes an upwardly extending post and a pair of ribs extending radially outward from a distal end of the post, and
in the engaged position a first portion of the pair of ribs of the at least one terminal of the pair of terminals of the plurality of battery cells is received within the pair of first slots of the plurality of first recesses and a second portion of the pair of ribs is received within the pair of second slots of the plurality of second recesses.

16. The vehicle of claim 10, wherein the biasing member is a plurality of tension springs.

17. The vehicle of claim 10,
wherein the battery pack further comprises:
a third elongated terminal connector having a plurality of third recesses;
a fourth elongated terminal connector having a plurality of fourth recesses, the third elongated terminal connector and the fourth elongated terminal connector movable between an engaged position and a disengaged position; and
a secondary biasing member extending between the third elongated terminal connector and the fourth elongated terminal connector, the secondary biasing member biases the third elongated terminal connector and the fourth elongated terminal connector towards the engaged position,
in the engaged position, the plurality of third recesses are engaged with the other one of the pair of terminals of the plurality of battery cells, the plurality of fourth recesses are engaged with the other one of the pair of terminals of the plurality of battery cells, the plurality of first recesses are engaged with the at least one terminal of the pair of terminals of the plurality of battery cells, and the plurality of second recesses are engaged with the at least one terminal of the pair of terminals of the plurality of battery cells, and
in the disengaged position, the plurality of third recesses are disengaged from the other one of the pair of terminals of the plurality of battery cells, the plurality of fourth recesses are disengaged from the other one of the pair of terminals of the plurality of battery cells, the plurality of first recesses are disengaged from the at least one terminal of the pair of terminals of the plurality of battery cells, and the plurality of second recesses are disengaged from the at least one terminal of the pair of terminals of the plurality of battery cells.

18. A method of removing an individual battery cell from a battery pack having a plurality of battery cells, each battery cell having a pair of terminals at least one terminal, the method comprising:
removing a fastener from a first elongated terminal connector and a second elongated terminal connector, the fastener securing the first elongated terminal connector and the second elongated terminal connector to the battery pack, the first elongated terminal connector having a plurality of first recesses, the second elongated terminal connector having a plurality of second recesses, the first elongated terminal connector and the second elongated terminal connector moveable between an engaged position and a disengaged position, in the engaged position, the plurality of first recesses are engaged with at least one terminal of the pair of terminals of the plurality of battery cells and the plurality of second recesses are engaged with the at least one terminal of the pair of terminals of the plurality of battery cells, and in the disengaged position, the plurality of first recesses are disengaged from the at least one terminal of the pair of terminals of the plurality of battery cells and the plurality of second recesses are disengaged from the at least one terminal of the pair of terminals of the plurality of battery cells;
displacing the first elongated terminal connector and the second elongated terminal connector from an engaged position to a disengaged position against a biasing force of a biasing member extending between the first elongated terminal connector and the second elongated terminal connector such that the first elongated terminal connector is spaced apart from the second elongated terminal connector;
removing the first elongated terminal connector and the second elongated terminal connector from the battery pack in a first direction; and
removing the individual battery cell from the battery pack in the first direction.

* * * * *

UNITED STATES PATENT AND TRADEMARK OFFICE
CERTIFICATE OF CORRECTION

PATENT NO. : 11,721,875 B2
APPLICATION NO. : 16/806513
DATED : August 8, 2023
INVENTOR(S) : Geoffrey D. Gaither It is certified that error appears in the above-identified patent and that said Letters Patent is hereby corrected as shown below:

On the Title Page

Item (57), abstract, Line(s) 6, delete "having plurality" and insert --having a plurality--, therefor.

In the Specification

In Column 1, Line(s) 7 & 8, before "battery pack assemblies", delete "a".

In Column 1, Line(s) 38, delete "includes plurality" and insert --includes a plurality--, therefor.

In Column 4, Line(s) 46, delete "incudes" and insert --includes--, therefor.

In Column 6, Line(s) 40, after "a different height", delete "that the" and insert --than the--, therefor.

In Column 7, Line(s) 67, delete "X" and insert --+/-X--, therefor.

Signed and Sealed this
Twenty-fifth Day of June, 2024

Katherine Kelly Vidal
*Director of the United States Patent and Trademark Office*